W. S. BARNICKEL.
PROCESS FOR TREATING CRUDE OIL.
APPLICATION FILED MAR. 13, 1912.
1,093,098.
Patented Apr. 14, 1914.
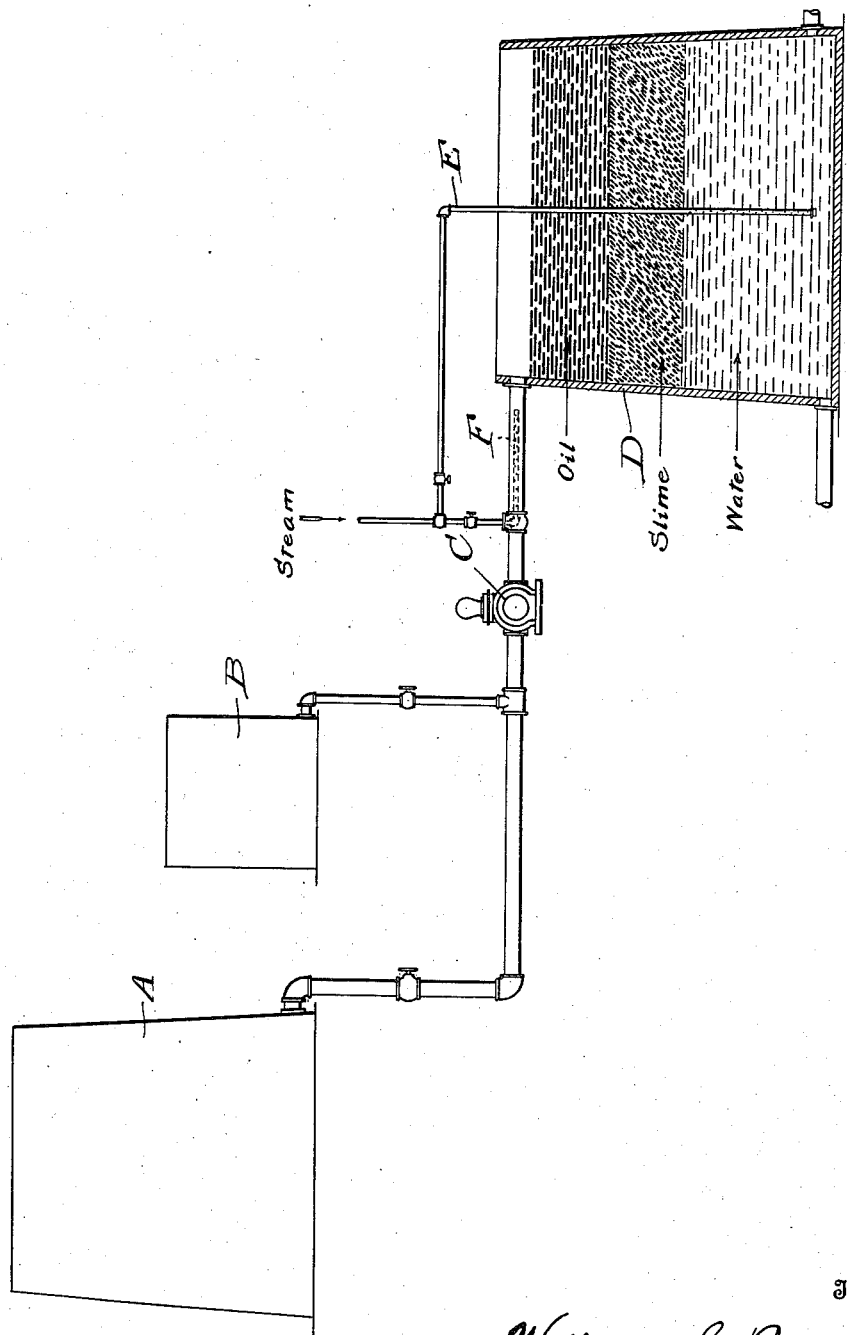
Witnesses
E. J. McGee.
Inventor
William S. Barnickel
By Howard A. Coombe
his Attorney

UNITED STATES PATENT OFFICE.

WILLIAM S. BARNICKEL, OF ST. LOUIS, MISSOURI.

PROCESS FOR TREATING CRUDE OIL.

1,093,098.

Specification of Letters Patent. Patented Apr. 14, 1914.

Application filed March 13, 1912. Serial No. 683,619.

*To all whom it may concern:*

Be it known that I, WILLIAM S. BARNICKEL, a citizen of the United States, residing at St. Louis, Missouri, have invented a certain new and useful Improvement in Processes for Treating Crude Oil, of which the following is a full, clear, and exact description, such as will enable others skilled in the art to which it appertains to make and use the same.

This invention relates to the treatment of certain kinds of natural oils, and has for its object to render such oils suitable for commercial use.

It not infrequently happens that a well will produce oil, which is so mixed with other substances that it is unfit for use and no way has heretofore been discovered, as far as I am aware, of successfully separating out the oil proper, without the loss of any of the valuable, volatile constituents.

The oils to which I refer are known in the oil-fields as "roily" oils, which term I will hereinafter use for convenience, and consist of a mixture of a slimy substance, water and petroleum, the latter being held in a state of suspension with the water and not separating out even when the liquid is allowed to stand for months.

If the percentage of foreign matter (slimy substance and water) is low, for example, less than 10%, the oil and water will separate to a large extent in course of time and, although the means I employ in my method, as hereinafter described and claimed, is capable of and adapted for use with roily oils of widely varying percentages of petroleum content, yet it is more particularly adapted and useful for oils containing not less than 10% of foreign matter (slimy substance and water), and from that up to 90% or more of foreign matter.

My method has proved eminently efficient and economical in actual practice and, by its use, many thousands of barrels of oil have been recovered from the production of wells which would otherwise have been nothing but waste material.

It must be clearly understood that the object and result of my method are not a mere separation of petroleum and water, (which may have emulsified therewith by accidental addition after the oil has left the well), but consist in the treatment of certain natural oils, as they come from the well, and which contain, besides the water and petroleum, a relatively large proportion of a slimy substance—the exact composition of which is unknown to me—which acts like an emulsifying agent and prevents the natural separation of the petroleum from the water. Oils of this kind are thick, viscous liquids, yellow to brown in color, and which when spread thinly over the ground, look almost like sand. In cold weather, it is sometimes so thick that it can be picked up on a shovel, although its consistency depends, of course, upon the relative percentage of petroleum and foreign matter which it contains. This foreign matter, when it has been separated from the petroleum as hereinafter described, consists of a slimy, gelatinous mass, of jelly-like consistency, and salty water. Such oils are produced by wells in the Louisiana, Texas, Oklahoma and California oil-fields, to my own knowledge, and doubtless occur in other fields. A well will frequently produce good oil for a time and then "go bad," in other words, produce "roily" oil and, as far as I am aware, no method had been discovered, prior to mine, of treating such oil commercially so as to render it fit for transportation and further treatment.

When the percentage of foreign matter is slight, a large part of the petroleum can be separated by boiling, but this is an expensive operation and causes a loss of the valuable volatile constituents, such as gasolene, naphtha, etc. It was also known that sulfuric acid would serve to produce the separation, but it is not practicable to use it because it combines with the petroleum, yielding a sulfonated oil which attacks the iron of the pipe lines and tank cars and hence oil so treated is not marketable. It was also known that soluble sulfates, salt, etc., would remove small amounts of water from oil by increasing its specific gravity, but the problem, which is solved by my process, is not to separate water from oil in the presence of each other only, but to isolate the slimy material described above, thus leaving the oil and water free to separate in the natural way.

I have discovered that the addition and intimate admixture of a very small percentage of a soluble metallic sulfate to the roily oil, causes the mixture, constituting the latter, to "break" promptly, and yield an upper stratum of clear petroleum, a lower stratum of clear water, and an intermediate stratum of slimy substance between the two, liquids, the lines of demarcation between the strata being clearly defined.

The stratum of slimy substance is so coherent and of such tenacity that, when a sample of the treated liquid is placed in a bottle and allowed to stand, until the three strata are clearly defined, and the bottle is then inverted, the relative positions of the strata will remain unchanged, that is the oil will be held at the bottom by the stratum of slimy substance, and the water at the top. This shows that the slimy substance has been peculiarly acted upon by the sulfate, which has caused it to collect together to form a coherent mass, clearly defined from the strata of petroleum and water.

My experience has been so far that sulfate of iron (copperas) is best adapted for this purpose, both on the score of economy and because it not only acts as a sulfate to effect the desired separation but also acts to clarify the resulting petroleum and water, combining with other substances, such as carbonate of lime and magnesia, which may be present in the water, and to free the latter from dissolved hydrogen sulfid and oxygen. Other sulfates may, however, be used, although not so advantageously.

In prior processes for separating water from oils by the use of soluble salts, relatively large amounts of the latter have been used, with the object of increasing the specific gravity of the water to such an extent that it will separate from the oil, but in my process, it is only necessary to use relatively very small amounts of the sulfate—as low indeed, in some cases, as one-hundredth of one per cent. of the roily oil being treated—and, furthermore, when the petroleum is of low gravity, I have frequently found it necessary to add a considerable amount of water, in order to enable the sulfate to permeate all through the liquid. In my process, therefore, as distinguished from the said old processes, I depend upon a peculiar action that the sulfate exerts upon the slimy foreign substance present in the oil and which holds it in a state of suspension in the water, which action consists in causing said substance to collect together in a mass, whereby the petroleum is permitted to rise to the top above said mass and the water to sink to the bottom below the same, and the freed petroleum can readily be drawn off.

In the practical operation of my process, I dissolve from 100 to 300 pounds of copperas in one barrel of water and mix the solution thoroughly with 1,000 barrels of roily oil, preferably heating the mixture to from 100° to 140° F. The water separates out at once and the slimy substance separates in from eight to twelve hours. None of the volatile constituents of the petroleum are lost, nor any of its constituents affected in any way. There is no refining action of the petroleum at all.

Naturally many arrangements of apparatus may be used in carrying out my process and, in the accompanying drawing, I have merely represented, diagrammatically, a simple arrangement, serving to illustrate how the operation is performed.

A represents a tank in which the roily oil is stored as it comes from the well; B a vessel in which the sulfate is dissolved; C a pumping system by which the oil and sulfate solution are drawn from tank A and vessel B, and which serves at the same time to thoroughly mix the oil and sulfate solution, and D represents the tank into which the mixture is delivered and allowed to stand until it has separated into the three strata of oil, slimy substance and water.

The copperas may be added in powdered form directly to the roily oil and then be thoroughly dissolved and mixed with the same by agitation, as by introducing steam through perforated pipes E and F, but, in practice, I prefer to mix the sulfate solution with the oil as it is pumped from one tank into another, as the passage through the pumps and pipes serves to thoroughly mix the liquids. Steam may also be injected into the pipes, as shown at F, for example, to assist in the mixing and to heat the mixture (if the weather is cold or the oil very thick, for example) or to expedite the process, the essential feature of which is that the sulfate,—in very small relative amount,—be caused to permeate every portion of the oil being treated.

Having thus described my invention, what I claim is:

1. The process of treating natural emulsions of petroleum, in which the foreign matter amounts to at least 10% and consists of water and slimy substances which act to maintain the water and petroleum emulsified, which consists in intimately mixing therewith a soluble metallic sulfate, in an amount relatively small as compared with the foreign matter, whereby the slimy substances are caused to collect in an intermediate layer between the water and the petroleum.

2. The process of treating natural oils containing slimy substances which act to hold the petroleum in suspension in water, which consists in intimately mixing therewith, in the presence of heat, a small percentage of a solution of a metallic sulfate, such as sulfate of iron, whereby said slimy substances are caused to collect in a mass and form an intermediate stratum between the freed petroleum and the water.

3. The process of treating natural oils of the kind described, which consists in introducing therein a solution of a metallic sulfate of such strength and quantity that the sulfate will amount to less than 1% of the matter foreign to the oil, thoroughly mixing the same and finally drawing off the petroleum from the top.

4. The process of treating natural oils of the kind described, which consists in introducing therein a solution of iron sulfate of such strength and quantity that the sulfate will amount to less than 1% of the matter foreign to the oil, thoroughly mixing the same and finally drawing off the petroleum from the top.

5. The process of treating natural emulsions of oil and water, containing foreign matter consisting of slimy substances and water, which substances act to maintain the oil and water emulsified, and in which such foreign matter amounts to at least 10%, for the purpose of recovering the petroleum without in any way altering its composition, which consists in intimately mixing therewith a soluble metallic sulfate in an amount relatively small as compared with the amount of foreign matter, and allowing the mixture to stand, whereby the slimy substances are caused to collect in a mass, and the water and petroleum are left free to separate.

In testimony whereof I hereunto affix my signature in the presence of two witnesses, this eighth day of March, 1912.

WILLIAM S. BARNICKEL.

Witnesses:
  WELLS L. CHURCH,
  GEORGE BAKEWELL.